United States Patent
Pöchmüller

(10) Patent No.: US 7,466,761 B2
(45) Date of Patent: Dec. 16, 2008

(54) CONFIGURATION FOR THE TRANSMISSION OF SIGNALS BETWEEN A DATA PROCESSING DEVICE AND A FUNCTIONAL UNIT

(75) Inventor: Peter Pöchmüller, Colchester, VT (US)

(73) Assignee: Qimonda AG, Munich (DE)

( * ) Notice: Subject to any disclaimer, the term of this patent is extended or adjusted under 35 U.S.C. 154(b) by 1110 days.

(21) Appl. No.: 10/292,844

(22) Filed: Nov. 12, 2002

(65) Prior Publication Data

US 2003/0074490 A1  Apr. 17, 2003

Related U.S. Application Data

(63) Continuation of application No. PCT/DE01/01727, filed on May 8, 2001.

(30) Foreign Application Priority Data

May 9, 2000  (DE) .................... 100 22 479

(51) Int. Cl.
    *H04L 27/04* (2006.01)
(52) U.S. Cl. .................................... 375/295
(58) Field of Classification Search .............. 370/84, 370/85.1, 69.1, 124, 319, 230, 231, 358, 370/391, 430; 710/235, 313, 104–106, 305–306, 710/315; 375/295; 341/56–57, 61
    See application file for complete search history.

(56) References Cited

U.S. PATENT DOCUMENTS

| 5,608,881 | A | * | 3/1997 | Masumura et al. .......... 710/310 |
| 5,666,480 | A | * | 9/1997 | Leung et al. ................... 714/1 |
| 5,778,218 | A | * | 7/1998 | Gulick ......................... 710/60 |
| 5,826,048 | A |   | 10/1998 | Dempsey et al. |
| 5,948,089 | A |   | 9/1999 | Wingard et al. |
| 6,005,896 | A | * | 12/1999 | Maruyama .................. 375/295 |
| 6,065,088 | A | * | 5/2000 | Bronson et al. ............. 710/263 |

(Continued)

FOREIGN PATENT DOCUMENTS

EP  0 780 773 A1  6/1997

(Continued)

OTHER PUBLICATIONS

G. Brent et al.: "Asynchronous Multi-Clock Bidirectional Buffer Controller", *OBM Technical Disclosure Bulletin*, vol. 24, No. 8, Jan. 1982, pp. 4404-4406.

*Primary Examiner*—Khai Tran
(74) *Attorney, Agent, or Firm*—Laurence A. Greenberg; Werner H. Stemer; Ralph E. Locher

(57) ABSTRACT

A configuration for the transmission of signals includes a data processing device and a functional unit, which are connected to a first and second bus system, respectively, for the respective transmission of signals with different frequencies. A transmission unit is connected to the data processing device through the first bus system and to the functional unit through the second bus system, for the transmission and conversion of signals between the data processing device and the functional unit. It additionally serves for the electrical decoupling of the first bus system and the second bus system. As a result, independently of the electrical properties of the functional unit, a high data throughput is made possible in conjunction with still good detectability of the signals to be transmitted.

12 Claims, 1 Drawing Sheet

U.S. PATENT DOCUMENTS

| | | | | |
|---|---|---|---|---|
| 6,160,638 A | * | 12/2000 | Yasuda | 709/227 |
| 6,201,316 B1 | | 3/2001 | Knecht | |
| 6,775,524 B2 | * | 8/2004 | Takeyabu et al. | 375/295 |
| 2003/0074490 A1 | * | 4/2003 | Pochmuller | 710/1 |

FOREIGN PATENT DOCUMENTS

GB        2 320 994 A        7/1997

* cited by examiner

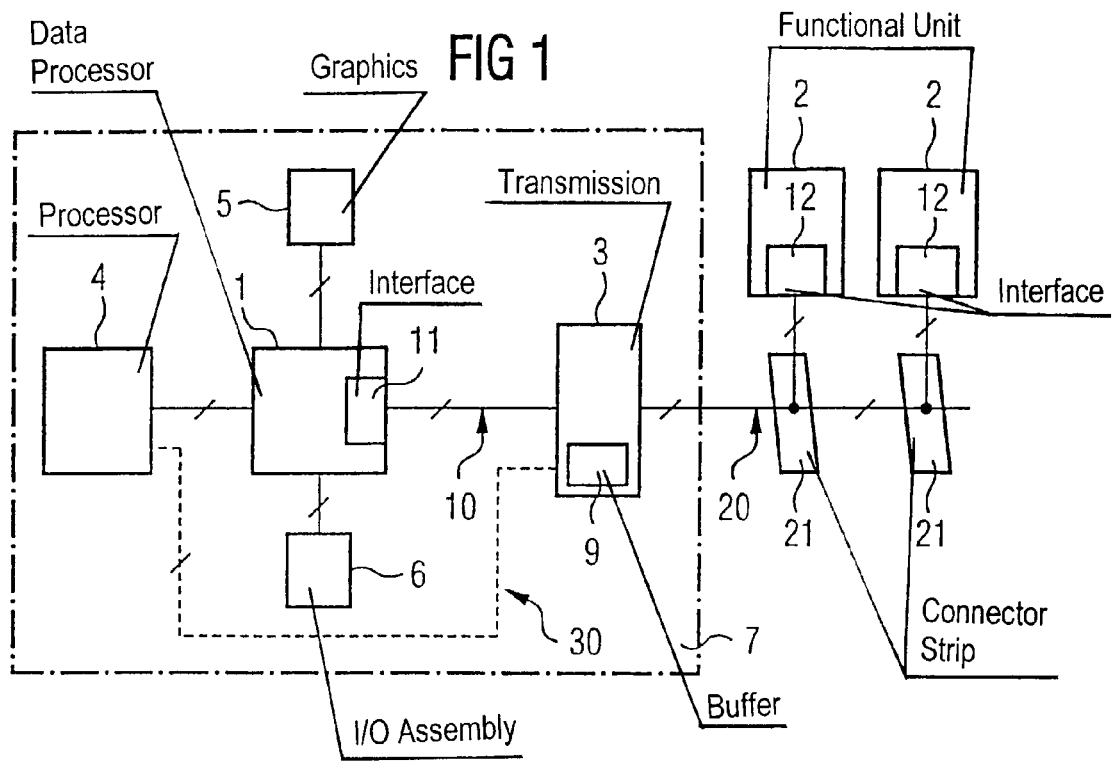
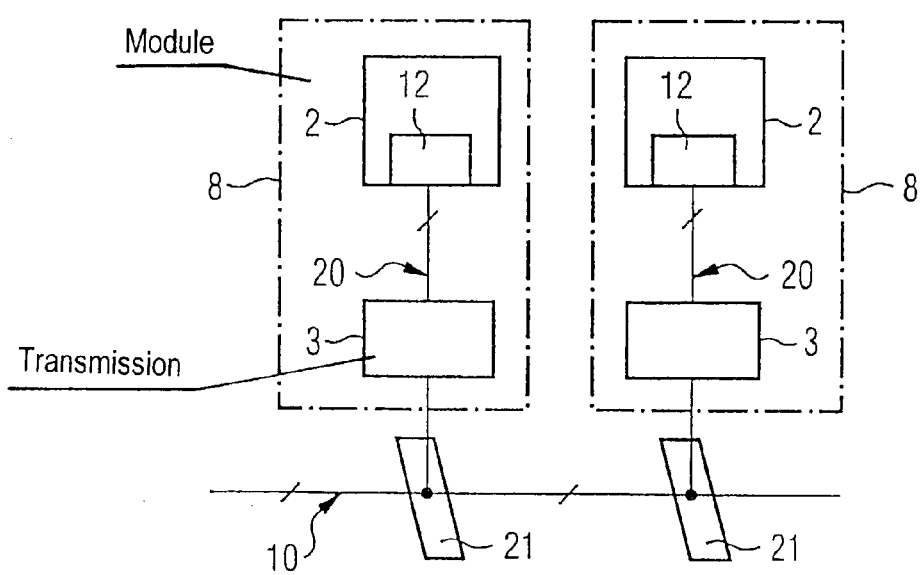

CONFIGURATION FOR THE TRANSMISSION OF SIGNALS BETWEEN A DATA PROCESSING DEVICE AND A FUNCTIONAL UNIT

CROSS-REFERENCE TO RELATED APPLICATION

This application is a continuation of copending International Application No. PCT/DE01/01727, filed May 8, 2001, which designated the United States and was not published in English.

BACKGROUND OF THE INVENTION

Field of the Invention

The present invention relates to a configuration for the transmission of signals between a data processing device and a functional unit.

Configurations for the transmission of various types of signals (for example, data, commands, or addresses) between a data processing device and a functional unit are used in various applications. By way of example, personal computer (PC) systems have data processing devices in the form of microprocessors or microcontrollers and functional units such as program memories, data memories or input/output peripheral assemblies. In such a case, the microprocessor usually represents the central control and arithmetic unit and is, therefore, also customarily referred to as the so-called central processing unit (CPU). The data memory, which is customarily embodied as a so-called random access memory (RAM), contains, for example, data that are accessed during a memory access. The electrical connection between the microprocessor and the data memory, for example, is customarily produced through a bus system.

It can generally be observed that, for increasing the data throughput, microprocessors are operated with increasing processing speeds and, thus, also increasing transmission frequencies. For this reason, in particular, endeavors are made to, likewise, increase the processing speed and transmission frequency on the corresponding bus system in order not to restrict the overall performance of the PC system. However, this can generally lead to physical and/or electrical problems. Particularly in the case of comparatively long bus systems to which a plurality of functional units are connected, increasing transmission frequencies can give rise to severe reflections and disturbances of signals to be transmitted. These can impair the signal quality and, thus, the detectability of the data to be transmitted. The reflections and disturbances are caused, for example, by a multiplicity of connected functional units and the, thus, restricted possibilities for suitable adaptation of the electrical parameters and/or by limited electrical properties of the bus systems and of the connected functional units.

SUMMARY OF THE INVENTION

It is accordingly an object of the invention to provide a configuration for the transmission of signals between a data processing device and a functional unit that overcomes the hereinafore-mentioned disadvantages of the heretofore-known devices of this general type and that enables a comparatively high data throughput in conjunction with still good detectability of the signals to be transmitted.

With the foregoing and other objects in view, there is provided, in accordance with the invention, a signal transmission configuration, including a first bus system, a second bus system, a data processing device connected to the first bus system for transmitting signals with a first frequency, a functional unit with an integrated memory module connected to the second bus system for transmitting signals with a second frequency different from the first frequency, and a transmission unit connected to the data processing device through the first bus system and to the functional unit through the second bus system, the transmission unit transmitting and converting the signals between the data processing device and the functional unit and electrically decoupling the first bus system and the second bus system, the first bus system connected only to the transmission unit and the data processing device.

The invention's configuration for the transmission of signals makes it possible to obtain a comparatively high throughput of signals to be transmitted. This is achieved, in particular, by virtue of the fact that the first bus system and the second bus system are electrically decoupled by the transmission unit. As a result, it is possible for the first bus system and the second bus system to be operated with different data transmission frequencies with the same data throughput. In such a case, the data processing device operates with a comparatively high transmission frequency, for example.

An interface unit of the data processing device is embodied, for example, in a production technology that can process comparatively high data transmission frequencies. The configuration according to the invention makes it possible for the functional unit or the interface unit thereof to be embodied in a second production technology, which permits slower data transmission frequencies in comparison therewith. In other words, the interface unit in the first production technology and the interface unit in the second production technology can, advantageously, differ in the maximum frequency of the signals to be transmitted.

The electrical decoupling of the bus systems, furthermore, makes it possible to embody the bus system with the higher transmission frequency such that relatively minor signal reflections occur. As a result, the signal quality and, thus, also the transmission frequency can be significantly increased. As a result of the electrical decoupling of the bus systems, however, it is not necessary to increase the electrical requirements made of the second bus system, to which the functional unit is connected, and the electrical requirements made of the functional unit itself or the interface unit thereof.

The invention can be employed particularly advantageously in a main memory system of a PC system. This customarily includes a relatively long memory bus system to which are connected one or a plurality of functional units containing memory circuits that are generally embodied as so-called RAMs. The provision of the transmission unit makes it possible to operate the memory bus or the connected memory circuits with a different data frequency in comparison with the data processing device, for example, a microprocessor or microcontroller. In the case of memory modules, it is generally relatively difficult to obtain high transmission frequencies of the interface units (also referred to as so-called interfaces because, for the purpose of relatively low production costs, the production process is optimized toward small memory cells with selection transistors that exhibit good blocking. In such a case, it is generally understood that memory technologies, therefore, cannot provide fast transistors without making the production process significantly more expensive. However, the transmission unit can now be developed in a fast logic technology. As a result of this, an interface unit of the data processing device and an existing interface unit of the transmission unit to the first bus system can be configured with a very high frequency.

To further increase the system performance, a fast buffer memory for storing a defined number of signals may be provided in the transmission unit. Such a buffer memory is also referred to as a so-called cache memory in which the signals required last are customarily stored. As a result, an access through the bus systems can often be accelerated because frequently required commands and data are still available in the cache memory.

In accordance with another feature of the invention, the transmission unit is embodied such that the signals are transmitted with frequency division multiplexing. In other words, at the second bus system to the functional unit, by way of example, a comparatively low frequency is combined with a relatively wide data/command word. At the first bus system to the data processing device, by way of example, a comparatively high frequency is combined with a relatively narrow data/command word. Such frequency division multiplexing cannot generally be carried out directly by a microcontroller because the latter, on account of the usually numerous interfaces to further bus systems, would otherwise require an excessively high number of connections on the housing.

In accordance with a further feature of the invention, the transmission unit is a frequency division multiplexing transmission unit transmitting the signals with frequency division multiplexing.

In accordance with an added feature of the invention, one of the bus systems is configured for the transmission of binary signals and the respective other bus system is configured for the transmission of so-called multilevel signals. The latter are generally signals with more than two voltage levels for representing logic states. In such a case, the transmission unit is embodied such that the signals are transmitted with conversion between the binary signals and the multilevel signals. As a result, it is possible, by way of example, for the first bus system to be operated with a relatively high frequency for the transmission of binary signals. In addition, these signals can be operated with relatively low signal levels. In contrast thereto, the second bus system can be operated with low frequency for the transmission of multilevel signals for reduction of the signal frequency. In addition, it is possible to choose higher signal levels or signal voltages that support multilevel signals.

One of the bus systems is connected only to the transmission unit and the data processing unit. Thus, for that bus system that is operated with higher signal frequencies a so-called point-to-point connection is created that can be configured such that relatively minor reflections occur even at relatively high signal frequencies. As a result of this, the signal quality and, thus, the signal frequency can, furthermore, be significantly increased.

Signal reflections and signal disturbances are generally amplified if, on a relatively long bus system, additional connection devices are provided that serve for taking up functional units and for electrically connecting the functional units to the bus system. Therefore, the invention can be used particularly advantageously in the case of bus systems that have such a connection device, for example, in the form of a so-called connector strip. If the second bus system has such a connection device, then the transmission frequency of the second bus system can be chosen such that signal reflections are comparatively minor.

In accordance with an additional feature of the invention, the data processing device and the transmission unit are disposed on a common printed circuit board module. The latter is, for example, a so-called motherboard of the PC system. It is, thus, possible to operate the first bus system between the data processing device and the transmission unit with a very high frequency.

As an alternative thereto, it is also possible for the functional unit and the transmission unit to be disposed on a common printed circuit board module. If the functional unit contains a memory circuit of the DRAM type, then the printed circuit board module is embodied, for example, as a so-called DIMM module.

In accordance with yet another feature of the invention, the data processing device is a microprocessor.

In accordance with yet a further feature of the invention, there is provided a microprocessor connected to the data processing device.

In accordance with yet an added feature of the invention, a third bus system connects the microprocessor to the transmission unit and the transmission unit transmits signals between the microprocessor and the functional unit.

In accordance with yet an additional feature of the invention, the second bus system has a connection device including the functional unit and electrically connecting the functional unit to the second bus system.

In accordance with again another feature of the invention, the transmission unit has a buffer memory for storing a defined number of signals.

In accordance with a concomitant feature of the invention, the data processing device has a first interface unit in a first production technology, the functional unit has a second interface unit in a second production technology, and the first interface unit and the second interface unit differ in a maximum frequency of the signals to be transmitted.

Other features that are considered as characteristic for the invention are set forth in the appended claims.

Although the invention is illustrated and described herein as embodied in a configuration for the transmission of signals between a data processing device and a functional unit, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1 is a block circuit diagram of one embodiment of the configuration according to the invention; and FIG. 2 is a block circuit diagram of another embodiment of the configuration according to the invention.

DESCRIPTION OF THE PREFERRED EMBODIMENTS

The figures each show configurations for the transmission of signals or data signals. In such a case, the term data signal is used as a generic term for digital signals that contain information about, for example, data, commands or addresses for processing in the data processing device.

Referring now to the figures of the drawings in detail and first, particularly to FIG. 1 thereof, there is shown an embodiment of a main memory system of customary PC systems. A microprocessor 4 communicates with a data processing device 1, which, in this case, is configured as a so-called microcontroller. The communication is carried out with a frequency of 1 GHz, for example. The data processing device 1 embodied as a microcontroller controls the access by the microprocessor 4 to the various system components, such as, for example, the functional units 2 embodied as main memory modules, an I/O assembly 6 and graphics card 5. The transmission on the bus system 10 is, in this case, likewise carried out with a frequency of 1 GHz.

The microcontroller 1 has an interface unit 11, which is embodied in a first production technology. The interface unit 11, also referred to as interface, is connected to the first bus system 10. A second bus system 20 is provided with connector strips 21, which are configured for taking up the functional units 2 and for electrically connecting the functional units 2 to the second bus system 20. The functional units 2 each have interface units 12, which are, in each case, embodied in a second production technology and connected to the second bus system 20 by the connector strips 21. The configuration, furthermore, has a transmission unit 3, which is connected to the microcontroller 1 through the first bus system 10 and to the functional units 2 through the second bus system 20. In such a case, the transmission unit 3 serves for the transmission and conversion of data signals between the microcontroller 1 and the functional units 2 and for the electrical decoupling of the first bus system 10 and the second bus system 20. In this exemplary embodiment, the functional units 2 each contain integrated memory circuits, preferably, configured as DRAMs. The bus system 20 is operated with a frequency that is less than the frequency of the bus system 10.

The interface 11 of the microcontroller 1 and the respective interface 12 of the functional units 2 differ in the maximum frequency of the data signals to be transmitted. By way of example, the interface 11 is embodied in a fast production technology and the interfaces 12 are embodied in a slow production technology in comparison therewith. The second bus system 20, which, in this case, functions as a so-called memory bus, is relatively long and typically has a plurality of connector strips 21 or module slots. Such a configuration fosters the production of signal reflections and disturbances.

In this embodiment of the invention, the microprocessor 4 is connected to the data processing device 1 embodied as a microcontroller. As an alternative, the microprocessor 4 can also be connected to the transmission unit 3 through a third bus system 30, illustrated by a broken line in FIG. 1. Data signals are directly exchanged between the microprocessor 4 and the functional units 2 through the bus system 30 by the transmission unit 3.

In FIG. 1, the first bus system 10 is connected only to the transmission unit 3 and the microcontroller 1. This so-called point-to-point connection can be configured (e.g., by so-called resistance matching) such that relatively minor signal reflections occur even at high signal frequencies. The bus system 10 can, therefore, be operated with the relatively high signal frequency without the signal quality being impaired.

The provision of the transmission unit 3 makes it possible to operate the bus system 10 and the bus system 20 with different signal frequencies in conjunction with a high data throughput. The memory bus 20 or the functional units 2 with memory circuits disposed thereon can be operated with a lower signal frequency in comparison therewith so that previous memory technologies can, advantageously, be employed for producing the memory circuits. In such a case, the development of the transmission unit 3 is independent of the development of the functional units 2 or the memory circuits disposed thereon. Therefore, the transmission unit 3 can be developed in a comparatively fast logic technology.

The transmission unit 3 is embodied, for example, such that the data signals are transmitted with frequency division multiplexing. In other words, the transmission unit 3 transfers high-frequency data signals on the bus system 10 with a defined data/command word width into data signals on the bus system 20 with, in comparison therewith, a larger data/command word width and a lower frequency. By way of example, if 4:1 multiplexing is realized for the data signals, then four data or command words that are successively provided on the bus system 10 are converted into a data or command word that is four times wider but by the same token has a frequency four times lower, at the bus system 20. In other words, in this exemplary embodiment, a narrow bus system 10 with a high signal frequency is converted to a wide bus system 20 with a low signal frequency.

In a further embodiment, as an alternative or else in addition, it is possible to use so-called multilevel signals for further reduction of the signal frequency. With the use of multilevel signals, more than two voltage levels are transmitted on a bus line. This is applicable, in particular, to bus systems that operate with comparatively high voltages. In such a case, the bus system 10 is, furthermore, operated with binary data signals and can, therefore, be operated with comparatively low voltages and high frequencies. At the memory bus, it is possible to choose higher voltages that support multilevel signals. This is possible because electrical decoupling of the bus systems 10 and 20 is achieved by the transmission unit 3. The transmission unit 3 carries out a conversion between the binary data signals on the bus system 10 and the multilevel data signals on the bus system 20.

The interface units 11 and 12, respectively, contain, for example, bus drivers for the data signals. The microprocessor 4 contains the central control and arithmetic unit, also referred to as the so-called central processing unit, which communicates with the microcontroller 1 for control purposes or for controlling the access to the main memory system. To accelerate the access, the transmission unit 3, advantageously, has a buffer memory 9, which stores a defined number of data signals that were required last. The buffer memory 9 is, preferably, embodied as a fast buffer memory in the form of a so-called cache memory.

In accordance with the exemplary embodiment according to FIG. 1, the data processing device or the microcontroller 1 and the transmission unit 3 are disposed on a common printed circuit board module 7. It is, thus, possible to operate a relatively short bus system 10 with comparatively high frequencies so that minimal signal reflections and disturbing effects are produced. The printed circuit board module 7 is, for example, a so-called motherboard of a PC system on which the microprocessor 4 and the further assemblies 5 and 6 are additionally applied.

In a further embodiment of the configuration according to the invention as shown in FIG. 2, the functional units 2 or memory modules together with corresponding transmission units 3 are respectively disposed on a common printed circuit board module 8. This, furthermore, makes it possible to use relatively low-frequency memory modules. However, the bus system 10 must be made longer compared with FIG. 1 and, moreover, the bus system 10 is additionally routed through the connector strips 21. The printed circuit board module 8 on which the memory modules 2 are applied is a so-called DIMM module, for example.

I claim:

1. A signal transmission configuration, comprising:
   a first bus system;
   a second bus system;

a data processing device connected to said first bus system for transmitting signals with a first frequency;

a functional unit with an integrated memory module connected to said second bus system for transmitting signals with a second frequency different from said first frequency; and a transmission unit connected to said data processing device through said first bus system and to said functional unit through said second bus system, said transmission unit transmitting and converting the signals between said data processing device and said functional unit and electrically decoupling said first bus system and said second bus system, said first bus system connected only to said transmission unit and said data processing device.

2. The configuration according to claim 1, wherein said transmission unit transmits the signals with frequency division multiplexing.

3. The configuration according to claim 1, wherein said transmission unit is a frequency division multiplexing transmission unit transmitting the signals with frequency division multiplexing.

4. The configuration according to claim 1, wherein:
one of said first and second bus systems transmits binary signals and another of said first and second bus systems transmits multilevel signals; and
said first bus system is connected only to said transmission unit and said data processing device.

5. The configuration according to claim 1, wherein said data processing device and said transmission unit are disposed on a common printed circuit board module.

6. The configuration according to claim 1, wherein said functional unit and said transmission unit are disposed on a common printed circuit board module.

7. The configuration according to claim 1, wherein said data processing device is a microprocessor.

8. The configuration according to claim 1, including a microprocessor connected to said data processing device.

9. The configuration according to claim 8, wherein:
a third bus system connects said microprocessor to said transmission unit; and
said transmission unit transmits signals between said microprocessor and said functional unit.

10. The configuration according to claim 1, wherein said second bus system has a connection device including said functional unit and electrically connecting said functional unit to said second bus system.

11. The configuration according to claim 1, wherein said transmission unit has a buffer memory for storing a defined number of signals.

12. The configuration according to claim 1, wherein:
said data processing device has a first interface unit;
said functional unit has a second interface; and
said first interface unit and said second interface unit differ in a maximum frequency of the signals to be transmitted.

* * * * *